UNITED STATES PATENT OFFICE.

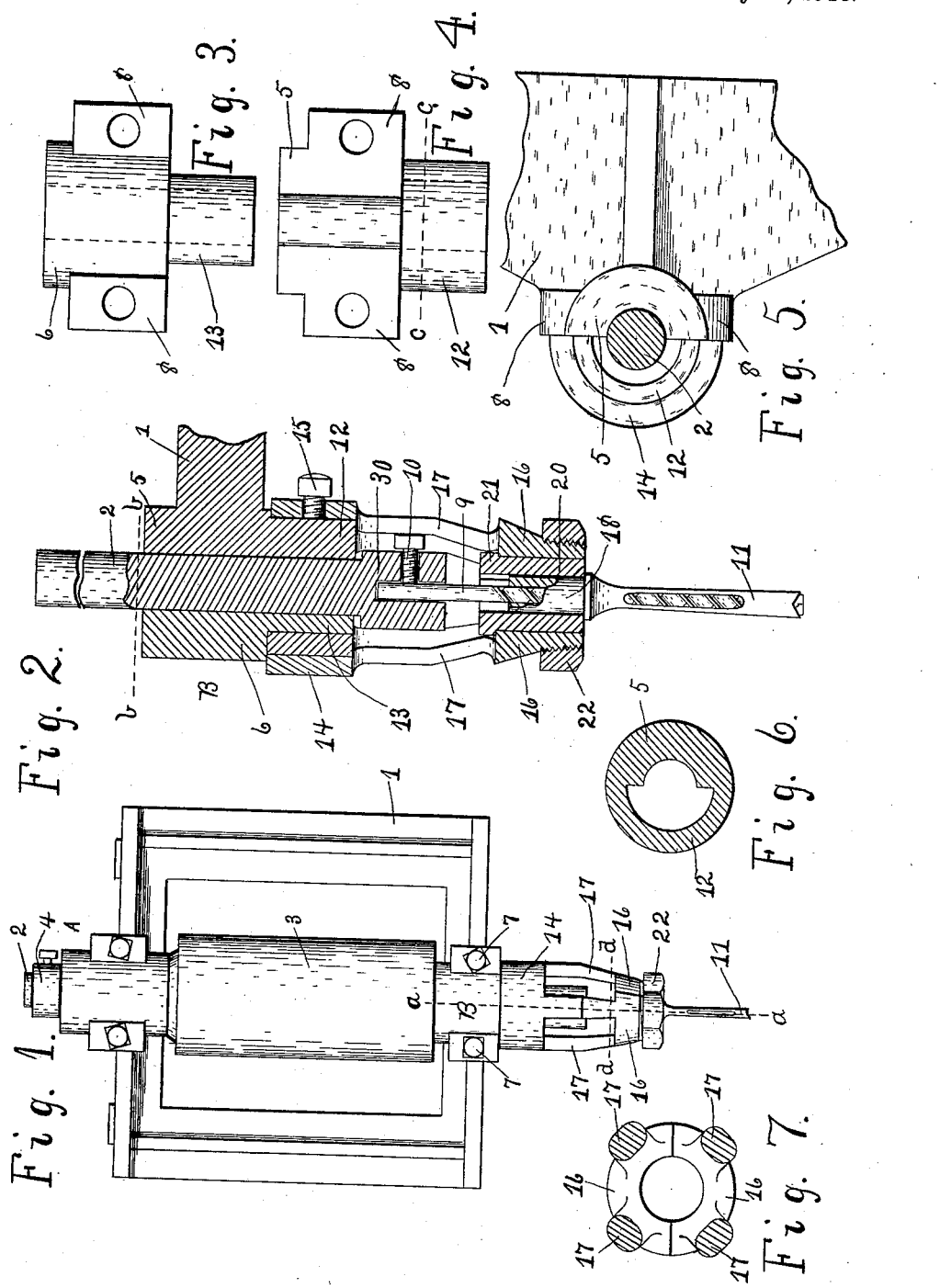

NEWTON L. BUTTS, OF NORWICH, NEW YORK, ASSIGNOR TO JOSEPH H. FITCH, OF ROCHESTER, NEW YORK.

MORTISING-MACHINE.

1,062,583.  Specification of Letters Patent.  Patented May 27, 1913.

Original application filed February 3, 1910, Serial No. 541,900. Divided and this application filed January 12, 1911. Serial No. 602,201.

*To all whom it may concern:*

Be it known that I, NEWTON L. BUTTS, of Norwich, in the county of Chenango and State of New York, have invented a new and useful Improvement in Mortising-Machines, which improvement is fully set forth in the following specification and shown in the accompanying drawings.

The present invention relates to mortising machines and more particularly to the type employing a rotary bit and a hollow chisel, this application being a division of an application for patent on mortising machines filed February 3, 1910, Serial #541,900.

An object of the invention is to provide for supporting the hollow chisel so that at all times it will be held in properly centered position with relation to the bit or auger.

To these and other ends the invention consists in certain parts and combinations of parts all of which will be hereinafter described, the novel features thereof being pointed out in the claims hereto appended.

In the drawings: Figure 1 is a front view of a tool support embodying the present invention; Fig. 2 is a section on line *a—a*, Fig. 1; Figs. 3 and 4 are detail views of a divided bearing which supports the chisel holder; Fig. 5 is a section on line *b—b*, Fig. 2; Fig. 6 is a section on the line *c—c* of Fig. 4; and Fig. 7 is a section on line *d—d* of Fig. 1.

In mortising machines it is customary to move the tool toward a work support or the work support toward the tool. So far as this invention is concerned it is immaterial how the relative movement is effected. In this instance, the tool is supported on a carriage 1 which carries two spaced bearings A and B for a shaft or tool support 2, a pulley 3 being preferably secured to the shaft between the bearings and having end thrust against the bearing A, a collar 4 engaging the bearing A on its opposite side to prevent axial movement of the shaft in its bearings.

Both bearings A and B are divided, that is, are formed of two axially extending members. The member 5 of bearing B, in this instance, is rigid or integral with the frame or carriage 1, while the member 6 is removable and is connected to the member 5 by bolts 7 uniting ears 8 extending laterally from the respective parts. The end of the shaft 2 is formed with a socket 30 in which is fitted the end of the bit or auger 9, a set screw 10 serving to hold the auger in position.

To the end that a hollow chisel 11 may be held centered properly relatively to the bit, a portion 12 which, in this instance, is in the form of a cylindrical or ring extension on bearing member 5 is integral with said member so that it will be held rigid or immovable relatively thereto, while permitting the members 5 and 6 to be separated and connected without disturbing the concentric relation between the tool driver or support and the portion 12 which supports the device for holding the hollow chisel, to be described. The cylindrical extension surrounds a reduced portion 13 on the bearing member 6 permitting the latter to coöperate with the rotary bit support 2.

In order that the chisel holding device may be supported on the divided bearing centrally about the rotary bit support, the said device has a ring portion 14 which tightly fits the cylindrical portion 12 and is held against displacement thereon by a set screw 15 or other suitable means.

The device for holding the hollow chisel is also constructed to center properly the chisel, and, to this end, is formed of at least two clamping jaws 16 which are supported so as to move toward and from each other preferably by arms 17 which may be formed of resilient material. The jaws are preferably curved so as to form a ring which engages either the upper cylindrical portion 18 of a hollow chisel 11 or a split bushing 20 which has an annular shoulder 21 resting on the upper side of the jaws and coöperating with the cylindrical portion 18 of a chisel when the latter is of small size.

To the end that the chisel clamping jaws may be moved simultaneously and the same distance a ring 22 may surround the jaws and coöperate therewith to force them together. Preferably the jaws are externally threaded and tapered and the ring is internally tapered and threaded to coöperate therewith.

In using the device, the ring 22 is lowered to permit the jaws 16 to separate slightly, the normal tendency of the arms 17 being to hold the jaws slightly separated. This permits the upper or cylindrical portion of the chisel to be engaged by the jaws or by the internal wall of the bushing 20, the latter also having a tendency to expand. The ring 22 is now rotated to move the jaws and clamp the chisel. The upper end of the bit is introduced into the socket 30 of shaft 2 and the set screw 10 adjusted to secure the bit, the spaces between the arms 17 permitting the set screw to be reached. These spaces also served to permit the discharge of the clips cut by the bit and the chisel.

A mortising machine constructed in accordance with this invention insures that the chisel will at all times be properly centered with reference to the bit or auger. The chisel holder is supported on a wide cylindrical surface which is properly centered and rigid with the bearing of the rotary bit support while permitting the latter to be removed. In removing the tool, it is not necessary to remove the chisel holder as the latter, owing to the space between its resilient arms, permits the set screw of the bit to be reached. The clamping means of the chisel holder is easily released and acts on the chisel to the same degree in opposite directions, having extended engagement with the chisel, so that it is impossible to improperly set the chisel with reference to the bit or auger. The split bushing also acts to center the chisel and any size chisel may be engaged if the size of the bushing is varied. Both the split ring and the clamping jaws engage the chisel in such a manner that the latter is not injured although it is firmly held.

What I claim as my invention, and desire to secure by Letters Patent, is—

1. In a mortising machine, the combination with a bearing and a rotary bit support turning in the same, and projecting from said bearing, the projecting portion being provided with bit securing means of a holder for supporting a hollow chisel in coöperative relation with the bit support, having a portion tightly fitting about a portion of the bearing a chisel securing portion, and an opening in its side between the chisel securing portion and the portion secured to the bearing, said opening being located so that the bit securing means may be reached therethrough.

2. In a mortising machine, the combination with a bearing having a cylindrical portion and a rotary bit support turning in the bearing concentric with the cylindrical portion, and projecting from said bearing, the projecting portion being provided with bit securing means, of a holder for supporting a hollow chisel in coöperative relation with the bit support, having a ring portion tightly fitting the cylindrical portion of the bearing, a chisel securing portion and an opening in its side between the chisel securing portion and the portion secured to the bearing, said opening being located so that the bit securing means may be reached therethrough.

3. In a mortising machine, the combination with a divided bearing and a portion integral with one member thereof, of a rotary bit support turning in said bearing, and projecting through the integral portion, the projecting portion being provided with bit securing means, and a holder for hollow chisels supported by the portion that is integral with one member of the divided bearing, a chisel securing portion and an opening in its side between the chisel securing portion and the portion secured to the bearing, said opening being located so that the bit securing means may be reached therethrough.

4. In a mortising machine, the combination with a divided bearing, of an integral cylindrical extension on one member of the bearing concentric with the axis of the bearing, a rotary bit support turning in said bearing, and projecting through said extension, the projecting portion being provided with bit securing means, and a holder for a hollow chisel having a portion fitting about the cylindrical portion of the bearing, a chisel securing portion and an opening in its side between the chisel securing portion and the portion secured to the bearing, said opening being located so that the bit securing means may be reached therethrough.

5. In a mortising machine, the combination with a divided bearing, of a portion integral with one member of the bearing and surrounding the other member, a rotary bit support turning in said bearing, and a holder for a hollow chisel having a portion fitting the integral portion of the bearing member that surrounds the other bearing member.

6. In a mortising machine, the combination with a divided bearing comprising a member having a ring shaped extension, and a member having a curved extension fitting within the ring shaped extension, of a bit support turning in said bearing, and a holder for a hollow chisel having a portion fitting about the ring shaped extension of the bearing.

7. In a mortising machine, the combination with a rotary bit support having bit securing means at one end, of a holder for hollow drills comprising a portion secured on one side of the bit securing means, movable clamping jaws on the other side of the securing means, and means for simultaneously moving said jaws toward each other, the holder being provided with an opening between the secured portion and the clamping jaws to permit the bit securing means to be reached.

8. In a mortising machine, the combination with a rotary bit support having bit securing means at one end of a bearing for the bit support and a holder for hollow drills comprising a portion secured to and surrounding a portion of the bearing on one side of the bit securing means, arms carried by said holder portion, projecting therefrom to the other side of the bit securing means and spaced apart to permit the bit securing means to be reached, clamping jaws carried by said arms, and means for simultaneously moving said jaws toward each other.

NEWTON L. BUTTS.

Witnesses:
 JANE A. MOORE,
 ARTHUR W. GRAVES.

Copies of this patent may be obtained for five cents each, by addressing the "Commissioner of Patents, Washington, D. C."